Aug. 14, 1962 M. M. SMITH ET AL 3,049,459
LUMINOUS FLOOR OR WALL COVERING AND METHOD OF MANUFACTURE
Filed Oct. 1, 1959 2 Sheets-Sheet 2

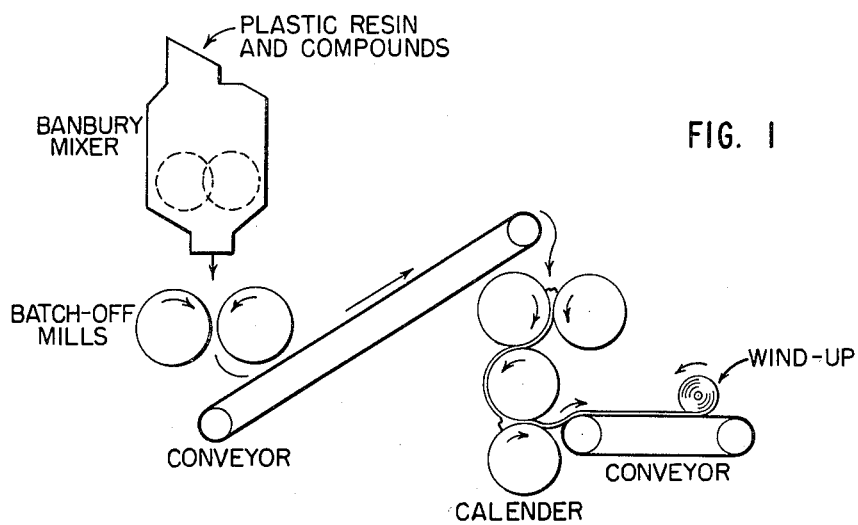
FIG. 1
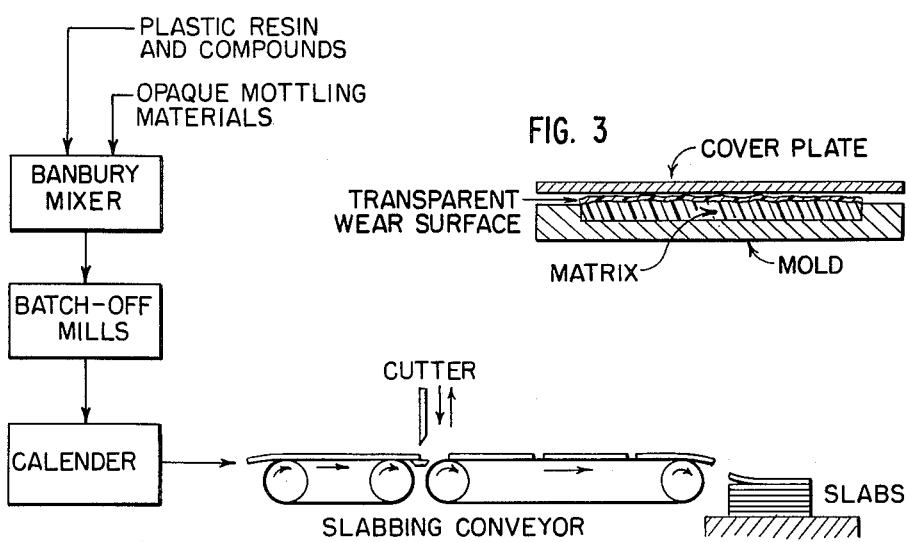
FIG. 2
FIG. 3

PATTERN OUTLINED
BY TRANSMITTED LIGHT

INVENTORS
Merrill M. Smith
Ernest P. Holmstrom &
Natalie S. Marcus.

3,049,459
LUMINOUS FLOOR OR WALL COVERING AND
METHOD OF MANUFACTURE
Merrill M. Smith and Ernest R. Holmstrom, Morrisville, Pa., and Natalie S. Marcus, Trenton, N.J., assignors to American Biltrite Rubber Co., Inc., Chelsea, Mass., a corporation of Delaware
Filed Oct. 1, 1959, Ser. No. 843,707
4 Claims. (Cl. 154—49)

This invention relates to elastomeric floor and wall coverings and comprises a new and improved marble-like structure that may be rendered luminous and decorative by light transmitted through a translucent matrix ply and also by light reflected from semi-opaque clouds scattered in the matrix ply. The invention includes within its scope the novel process herein disclosed for producing the said product.

The elastomeric material of this invention compares favorably with and in many respects is superior to the finest grades of translucent marble which because of high cost can be used only in the most expensive floor and wall covering installations. Such marbles are frequently decorated by inlaying with opaque inserts of contrasting color such as metallic strips or designs and the like. Compositions of that description are used only in very high quality building construction and are costly to prepare, assemble, and install. Because of its translucency, certain types of marble are desired for inlaying since reflected light from the inserts produces an effect of depth. In addition, the result of internal reflections of different colors from different depths within the marble yields a direct three-dimensional effect which only now for the first time has it been possible to duplicate by any available process of manufacture.

The new elastomeric product of our invention includes a dispersion or dispersions of colored clouds or areas of varying degrees of opacity in a relatively translucent or transparent matrix. The suspension of the relatively opaque clouds in the matrix is so carried out that only a controlled amount of mixing is permitted during milling of the product. The employment of a translucent or transparent matrix allows the reflected colors of certain opaque areas to be visible thereby giving the effect of depth and resemblances of marble itself. Certain steps in the preparation of our novel product include the introduction into the body of marble-like material of any desired decorative pattern which may be custom-designed to correspond to the style and coloring of the area in which the product is to be used.

The covering of our invention comprises three or more plies which in the finished product are fused together to make a single integral structure. The first or outer layer is completely transparent and of high abrasion resistance. It serves to protect the underlying plies and to permit the decorative pattern and various light-reflecting areas of the matrix to be clearly seen.

The second ply is a decorative design which is discontinuous and which may be printed or otherwise impressed upon the bottom of the first ply or the upper surface of the third ply, or it may be an inserted layer between the two. The design ply may be colored and either opaque or translucent. It is ideally suited to be formed of metallic inks which yield an effect similar to ornamentation formerly derived from metal inserts in marble.

The third or base ply is prepared by mixing the base compound or matrix material in a Banbury mixer until the matrix is brought to the desired temperature and degree of plasticity. During, or preceding this mixing process, an amount of color pigment and loading material may be added so as to yield the proper color while preserving the degree of translucency or transparency which is desired. When the matrix material has been properly fluxed, the opaque or semi-opaque material is added and the whole batch is mixed together at a pre-determined temperature and for the proper interval. The composition, physical shape, size and plasticity of this cloud material is of the utmost importance in determining the final appearance and quality of the product. It may be in the form of opaque or colored chips, granules or plates of desired dimensions and at temperatures as desired. The period of this milling step in the Banbury mixer must be very closely regulated. If milled too long or at too high a temperature some smearing will result and conversely if mixed for too short a period or at too low a temperature the effect will be one of granulation.

These and other features of our invention will be best understood and appreciated from the following description of a preferred manner of carrying out our novel process in the production of a typical example of the desired product, as illustrated in the accompanying drawings, in which—

FIG. 1 is a diagram suggesting the steps in making the transparent surface ply.

FIG. 2 is a diagram suggesting the steps in making the matrix ply.

FIG. 3 is a view in cross section showing the plies as being subjected to the final molding and unifying step.

Figure 4:
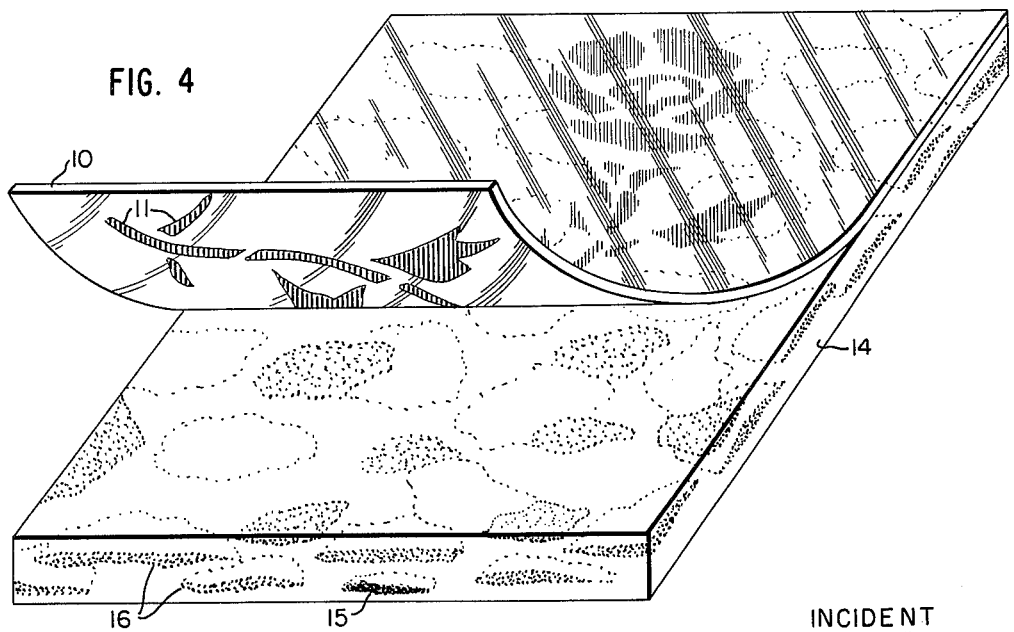
FIG. 4 is a view in perspective of a slab or panel of the finished product showing the transparent ply as partially detached.

As indicated in FIG. 1 the transparent upper or wear ply is produced by introducing into a mixer, such as the well-known Banbury mixer, plastic resin and compounds. A typical formula for this purpose is, by percent weight—

Polyvinyl chloride resin _____ 65.0
Di-octyl phthalate _____ 30.0
Epoxy plasticizer _____ 3.7
Barium-cadmium laurate _____ 1.3

100.0

A satisfactory product results from mixing for about three (3) minutes at about 325° F. The batch is then dropped into a sheeter mill, marked "Batch-Off Mills" in FIG. 1, and the sheet formed therein is transferred by a belt conveyor to calender rolls, marked "Calender," where the sheet is reduced accurately to the desired thickness, for example, to a film 0.004–0.025". From the calender rolls the transparent sheet or film is transferred by a second belt conveyor to a wind-up reel and may be stored in coil form until it is ready to be divided into slabs for the final molding operation.

A discontinuous decorative design 11 may be printed or otherwise impressed upon the bottom surface of the transparent ply 10, or alternatively upon the top surface of the underlying matrix ply 14, or it may be inserted as self-contained layer between the two. This decorative layer may be formed of highly reflecting metallic inks which yield an effect similar to metal inserts in marble, or it may be colored or translucent or opaque in accordance with the artistic effect desired. The decorative layer may also be formed from a polyvinyl chloride type of ink with suitable color pigments in a methyl-ethyl ketone solvent.

The third or matrix ply may be prepared as indicated in the diagram of FIG. 2 by first supplying to a Banbury mixer plastic resin and compounds, such for example, as

| | Percent |
|---|---|
| Polyvinyl chloride resin | 63.0 |
| Di-octyl phthalate | 32.0 |
| Epoxy plasticizer | 3.7 |
| Barium-cadmium laurate | 1.2 |
| Cadmium stearate | .1 |
| | 100.0 |

This matrix compound is milled until it is brought to the desired temperature and degree of plasticity. During the milling process coloring components or loading materials are added to yield the desired color while preserving the required degree of translucency or transparency of the compound.

After mixing the matrix compound for about three (3) minutes at about 325° F., it is ready for the addition of what we may call the "mottling" material, that is to say, the material of the opaque or semi-opaque cloud areas that are to appear in the finished matrix. The composition, physical shape, and plasticity of this material is of controlling importance in determining the final appearance and quality of the product. It may be added to the mix in the Banbury mixer in the form of chips, granules or plates of any desired dimensions. One suitable formula for mottle stock is as follows:

| Polyvinyl chloride resin | 62.0 |
|---|---|
| Di-octyl phthalate | 30.0 |
| Epoxy plasticizer | 3.7 |
| Barium-cadmium laurate | 1.5 |
| Titanium oxide | 2.0 |
| Aluminum flakes | .5 |
| Cadmium stearate | .3 |
| | 100.0 |

After the addition of this mottle stock to the Banbury mixing with the matrix stock is continued for about one (1) minute at 325° F.

As soon as the correct degree of mixing in the Banbury has been achieved, the batch is dropped into a sheeter mill marked "Batch-Off Mills" in FIG. 3. The sheet so produced is then fed to calender rolls from which it emerges as a matrix sheet of the desired thickness and pattern effect.

The matrix sheet then passes to a horizontal slabbing conveyor which advances the sheet to a vertically operating cutter and by this the sheet is divided into slabs of the proper size for the final molding step, all as shown in FIG. 2.

The calendered base slab is next molded under heat and pressure between platen plates to produce a smooth-surface finish on at least one side of the slab. This molding operation is a critical one as during it a certain amount of reorientation of the opaque material within the matrix takes place and this is also accompanied by surface and internal flow of both matrix and opaque material. For this reason, the calender gauge must bear a definite relationship to the molded gauge so that both surface and internal flow of the components are held under control. In practice, we have found that the calender gauge should be reduced 12 to 25% in arriving at a satisfactory molded gauge for the matrix slab. The reduction in gauge depends to some extent on the consistency of the mix and in general a coarse, hard mix requires more reduction than a fine, soft mix.

Figure 5:
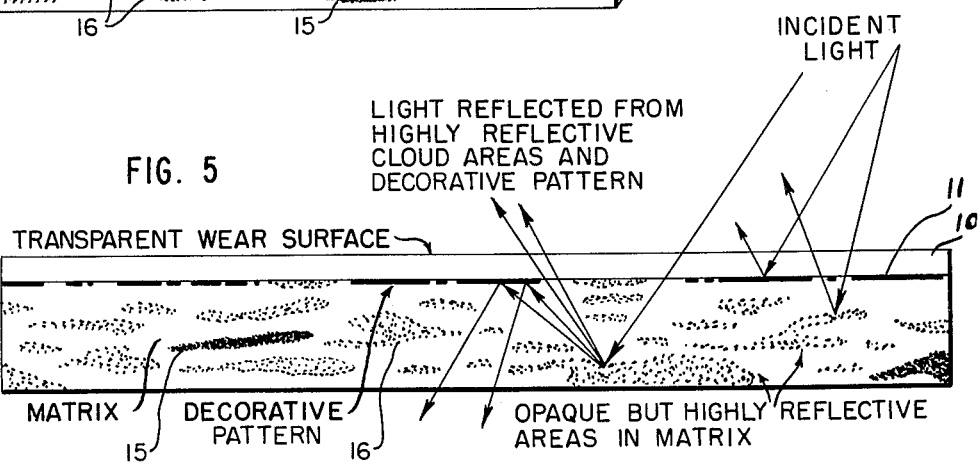
FIG. 5 is an edge view of the product on an enlarged scale.

The three component plies are now assembled for final fusing into a single sheet of the character shown in FIG. 5. For this step the matrix ply is placed within a mold cavity and upon this is placed the transparent wear surface ply to which the decorative discontinuous design ply has been adhered. The assembled plies are then subjected to heat and pressure beneath a mold cover-plate and the components are thus fused into a single integral slab with the outer surface of the translucent matrix fully exposed to incident light. The molding operation may be carried out on relatively small individual pieces or in a continuous sheet formation.

Figure 6:
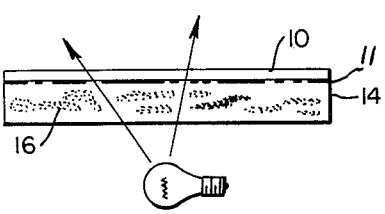
FIG. 6 is an edge view of the product on a smaller scale suggesting the path of transmitted light therethrough.

The finished product as shown in FIG. 5 comprises the upper transparent wear ply, the discontinuous decorative pattern and the relatively thick translucent matrix ply in which are distributed, somewhat at random, semi-opaque cloud areas 15 and 16, the darker cloud areas 15 being represented as more opaque than the semi-opaque cloud areas 16. In FIG. 5, the action of incident light upon finished slab is suggested. Certain light rays encounter the cloud areas in the matrix ply and are reflected out through the transparent wear surface from points at different depths within the matrix ply and emerge except in such areas as they are interrupted by encountering elements of the decorative design ply 11. If the product is illuminated by transmitted light as suggested in FIG. 6, rays will pass into and through the translucent matrix ply 14 and out through the transparent ply 10 except where they are masked by elements of the pattern ply 11. The general effect is that of a highly ornamental luminous surface with a distinct impression of depth and of superposed ornamentation.

The product resulting from the process above described resembles in every detail the most costly translucent types of marble having an inlaid decorative pattern. The product may be produced in any desired thickness, in any series of colors and with any desired type of ornamentation. Particular advantages of the product of our invention in comparison with marble are its lighter weight permitting easy and safe securing to a subsurface and its much higher flexibility and toughness which secures freedom from cracking, chipping, etc. Further, the overall translucency of the product may be varied at will so as to secure unusual lighting and decorative effects in which a portion or all of the light is transmitted through the slab itself thus causing the decorative pattern to stand out in bold relief. The high degree of transparency which may be secured when desired makes possible the transmission of light from the top surface into the interior of the matrix below the decorative pattern and the various degrees of reflectivity in the cloud areas of the matrix produce an unusual and unique illusion of depth as well as serving to outline the opaque decorative pattern.

Having thus disclosed our invention and described in detail an illustrative embodiment of our novel floor and wall covering, we claim as new and desired to secure by Letters Patent:

1. A light transmitting elastomeric floor or wall covering comprising a relatively thick matrix ply of translucent resinous compound containing light-reflecting clouds of semi-opaque plastic compound distributed throughout the matrix ply at different depths therein, together with a relatively thin transparent cover ply of plastic material, and a colored design ply enclosed between the matrix and the cover plies and united therewith in an integral slab, the outer surface of the said translucent ply being fully exposed to incident light.

2. A light-transmitting and reflecting floor or wall covering comprising a relatively thick matrix ply of translucent resinous compound containing scattered clouds of semi-opaque resinous compound arranged approximately flatwise in the matrix with light transmitting areas between them, the outer surface of the translucent matrix ply being fully exposed, an overlying light reflecting continuous design ply internally reflecting light transmitted through the matrix and defining also areas unobstructed to the passage of transmitted light, and a relatively thin transparent cover ply enclosing the design ply.

3. A luminous wall covering comprising a thick matrix ply of translucent resinous compound containing scattered clouds of semi-opaque light-reflecting resinous compound separated by light transmitting areas and disposed at different depths within the matrix, united to a thin transparent cover ply carrying a discontinuous opaque ornamental design in contact with the matrix ply, said design being outlined by light transmitted through the said light-transmitting areas of the matrix ply and illuminated by light reflected by the design through the said transparent cover ply, the outer surface of the translucent matrix ply being fully exposed to incident light.

4. The process of making marble-like floor and wall covering of resinous material, comprising the steps of (1) milling a mass of translucent vinyl matrix material with an added coloring component for about three minutes at an approximate temperature of 325° F., (2) adding to the matrix mass separate pieces of plastic of different degrees of opacity, and thereafter continuing the milling operation at the same temperature for about another minute, (3) sheeting and calendering the milled translucent matrix mass, (4) cutting the matrix sheet into separate slabs, (5) enclosing a colored design ply above the matrix, (6) assembling each matrix slab with a transparent vinyl cover sheet of substantially the same size, and (7) combining the assembled components by subjecting them to heat and pressure, with the outer surface of the translucent matrix ply fully exposed to incident light.

References Cited in the file of this patent

UNITED STATES PATENTS

| | | |
|---|---|---|
| 1,873,587 | Humphreys et al. | Aug. 23, 1932 |
| 2,455,777 | Jones | Dec. 7, 1948 |
| 2,617,750 | Le Clair et al. | Nov. 11, 1952 |
| 2,987,102 | Heinrichs | June 6, 1961 |
| 2,987,103 | Yakubik | June 6, 1961 |